United States Patent [19]

Fallik

[11] Patent Number: 5,067,040
[45] Date of Patent: Nov. 19, 1991

[54] EXPANDABLE REFRIGERATED ENCLOSURE FOR COMPUTER BOARDS

[76] Inventor: Joel Fallik, 56 Arthur Pl., Yonkers, N.Y. 10701

[21] Appl. No.: 587,014

[22] Filed: Sep. 24, 1990

[51] Int. Cl.⁵ ............................................. H05K 7/20
[52] U.S. Cl. .................................. 361/384; 361/394; 361/396
[58] Field of Search ........................ 361/380, 383–384, 361/393, 394, 395, 396, 399; 62/418

[56] References Cited

U.S. PATENT DOCUMENTS

| | | | |
|---|---|---|---|
| 3,054,024 | 9/1962 | Dillen et al. | 361/393 |
| 4,558,914 | 12/1985 | Prager et al. | 361/393 |
| 4,858,070 | 8/1989 | Buron et al. | 361/384 |
| 4,953,658 | 8/1990 | Harris | 361/396 |

Primary Examiner—Gregory D. Thompson
Attorney, Agent, or Firm—Brumbaugh, Graves, Donohue & Raymond

[57] ABSTRACT

Expandable enclosures for computer circuit boards include thermoelectric cooling for temperature control and are sealed to exclude dust and liquids. Expansion sections to house additional circuit boards are inserted between stacked sections with data and power interconnections between sections. The stacked configuration permits expansion of board capacity without increasing the lateral dimensions, or footprint, of the enclosure. Related components may also be housed.

12 Claims, 2 Drawing Sheets

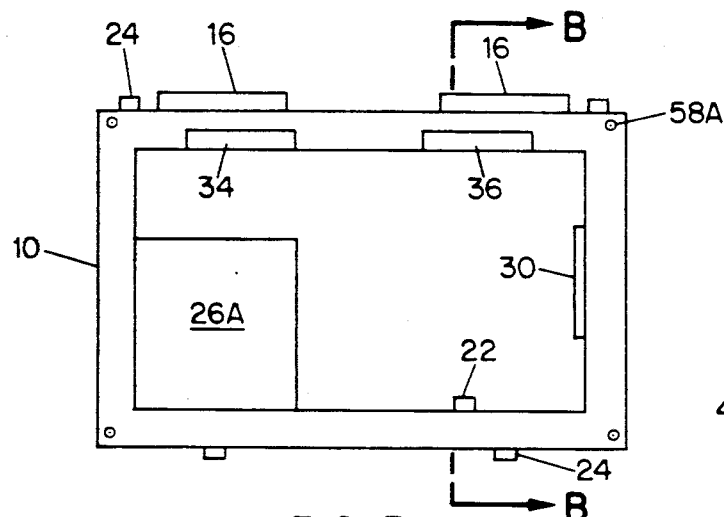
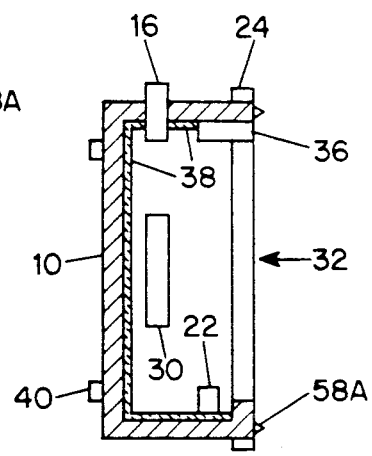
FIG. 3A  FIG. 3B
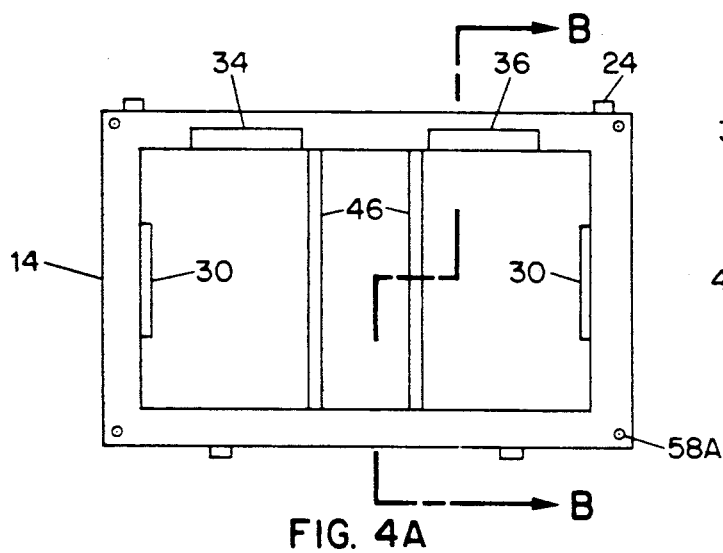
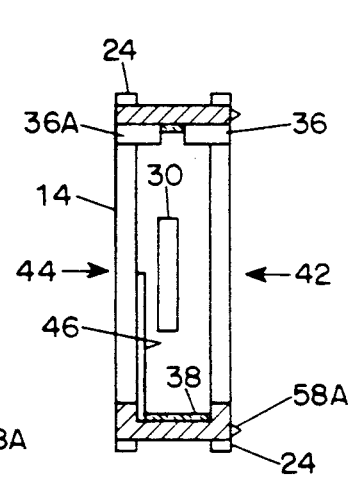
FIG. 4A  FIG. 4B
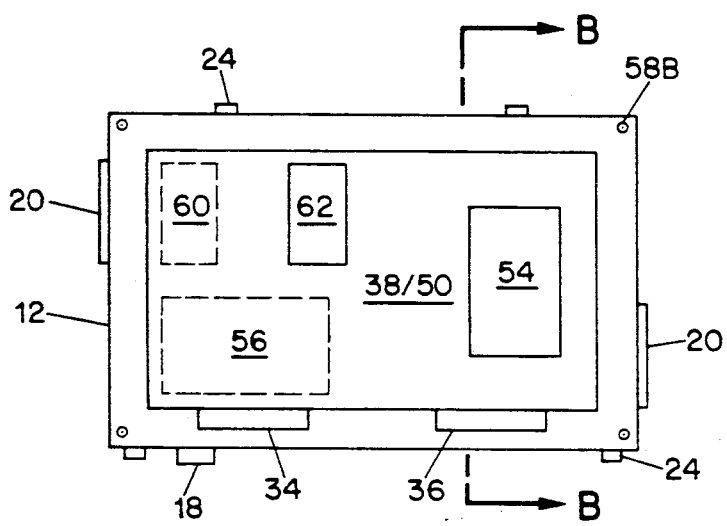
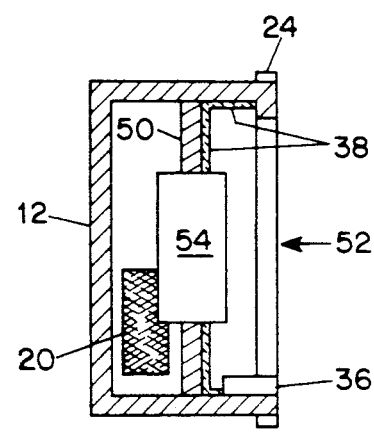
FIG. 5A  FIG. 5B

EXPANDABLE REFRIGERATED ENCLOSURE FOR COMPUTER BOARDS

BACKGROUND OF THE INVENTION

This invention relates to enclosures for electronic circuit boards and related elements and, more particularly to enclosures for computer boards which are both sealed and expandable, so as to provide temperature and environmental protection in a structural form that can be readily expanded without increasing the required shelf space or "footprint" of the enclosure. In accordance with the invention, temperature protection in sealed circuit board enclosures is provided by thermoelectric cooling systems.

In many personal or desk-top type computer installations desk-top and shelf space is at a premium. As computer boards or cards are desired to be added to provide expanded computer capabilities, installation space for the new boards can be either not available or involve additional units and complex cabling. This adds to the desk-top or shelf area required for the entire computer system or, where additional contiguous space is not available, may require shifting and relocation of units with disconnection interruption and addition of further cables.

It is, therefore, an object of the present invention to provide electronic circuit board enclosures which can readily provide expanded capacity without requiring additional desk-top or shelf space, and which also provide temperature control and protection from environmental factors for computer boards, power supplies and related elements.

SUMMARY OF THE INVENTION

In accordance with the present invention, an expandable refrigerated enclosure for electronic circuit boards includes a base section suitable for enclosing a main electronic circuit board and having a data input and output port and a top opening with associated data and power coupling means adapted to cooperate with other enclosure sections, and an expansion section suitable for enclosing an electronic circuit board and including top and bottom openings with associated data and power coupling means similarly adapted to cooperate with other enclosure sections. The enclosure further includes a service section suitable for enclosing a power supply and thermoelectric cooling elements and having a bottom opening with such associated data and power coupling means, alignment means adjacent to the section openings for aligning the sections and fastening means for releasably coupling the base, expansion and service sections together to form a sealed enclosure. In accordance with the invention, the service section is partitioned so as to contain a space within the service section adjoining its bottom opening and includes thermoelectric cooling means mounted in an opening through the partition for transferring heat out of the sealed enclosure.

For a better understanding of the invention, together with other and further objects, reference is made to the following description, taken in conjunction with the accompanying drawings, and its scope will be pointed out in the appended claims.

BRIEF DESCRIPTION OF THE DRAWINGS

FIG. 3A is a plan view of the base section of FIGS. 1 and 2, and FIG. 3B is a sectional view thereof;

FIG. 4A is a plan view of one of the expansion sections of FIG. 2, and FIG. 4B is a sectional view thereof; and FIG. 5A is bottom view of the service section of FIGS. 1 and 2, and FIG. 5B is a sectional view thereof.

DESCRIPTION OF THE INVENTION

Figure 1:
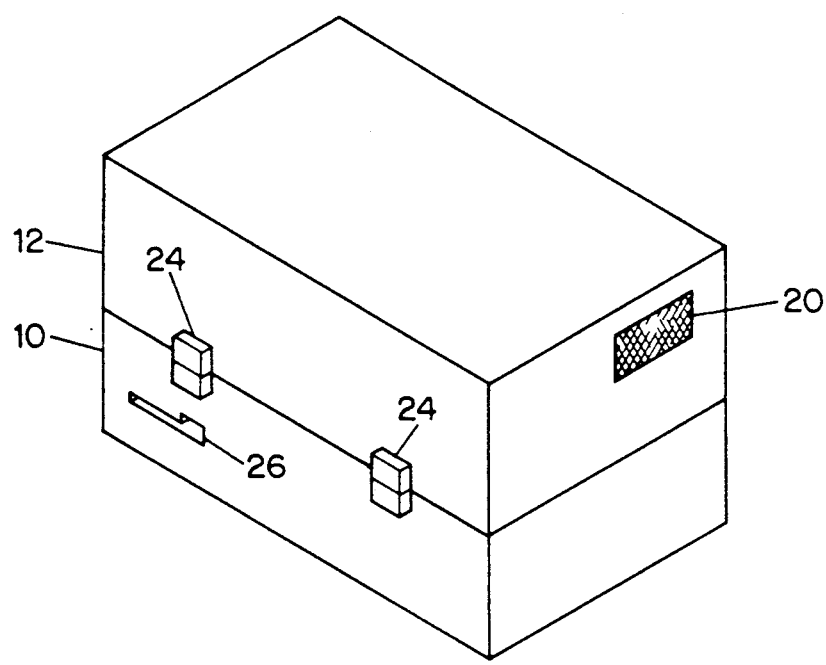
FIG. 1 is a front view of an expandable enclosure in accordance with the invention which includes stacked base and service sections.
Figure 2:
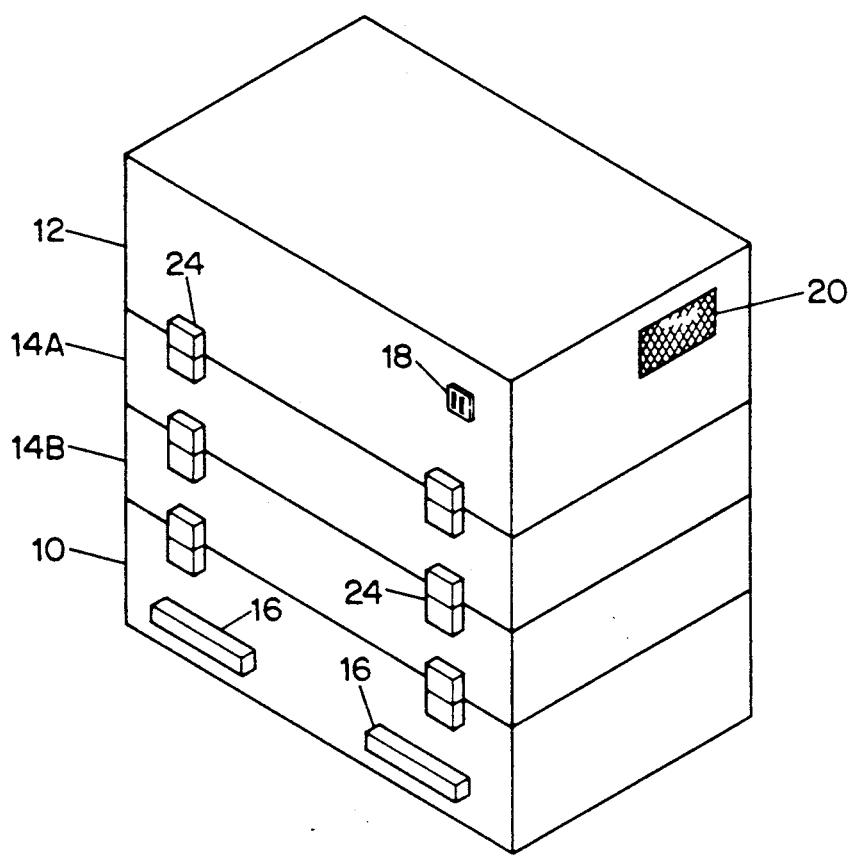
FIG. 2 is a back view of an enclosure including the FIG. 1 base and service sections with two expansion sections installed therebetween in accordance with the invention.

Referring now to FIGS. 1 and 2, there are shown expandable enclosures for electronic circuit boards and related elements in accordance with the invention. FIG. 1 is a front view of an enclosure including a first or base section 10 configured so as to be suitable for enclosing a main electronic circuit board, sometimes referred to as a "mother board", and a service section 12 configured so as to be suitable for enclosing power supply and cooling elements, as will be described in more detail below. FIG. 2 is a back view of an enclosure including first section 10 and service section 12 as shown in FIG. 1, and also including two substantially identical expansion sections 14A and 14B inserted between sections 10 and 12.

Other features of the enclosures as illustrated in FIGS. 1 and 2 include data input and output ports, shown as electrical connector jacks 16, a power input port, shown as power jack 18, ventilation ports, shown as vent opening 20, and fastening means, shown as latches 24. In application of the invention, those skilled in the art will readily be able to adapt these features to the requirements of particular uses. Thus, the data ports 16 represent one or more interconnecting data cable connections, as appropriate, power jack 18 can be a power cord receptacle or the entry point for a power cable, and vent means, shown as ventilation ports 20 at each end of section 10, may be provided with filter media and protective cover grids as appropriate. Also, the fastening means 24, which may operate alone or in conjunction with alignment pins to be described, can be any appropriate form of latch or coupling device. The nature of the circuit boards and related elements to be included within the enclosure will be determined by the particular application. By way of example, FIG. 1 shows a floppy disc insertion slot 26, and installation of other elements such as power supply and cooling units will be described further.

With reference now to FIGS. 3A, 4A and 5A, there are respectively shown plan views of base section 10 and expansion section 14 (representing either section 14A or 14B of FIG. 2) and a bottom view of service section 12. Sectional views of the respective sections are shown in FIGS. 3B, 4B and 5B.

In FIGS. 3A and 3B, there is shown a first or base section 10 suitable for enclosing a main electronic circuit board, or mother board. A circuit board (not shown) can be plugged into a data coupling port, indicated as a board coupling jack 30 mounted to the side wall, and suitably supported from the bottom of the section so as to be securely held in place as well known in the art. The section 10 includes an opening 32 in a principal surface (in this case the top of section 10 which is substantially horizontal in the norma operational orientation of the section). The base section 10 further includes data and power coupling means associated with the opening 32. As shown, these means respectively comprise electrical connector assembly 34 for coupling data to and from the board jack 30 (for coupling in turn to the circuit board) and power connector assembly 36 for coupling power supply voltages to the board jack 30. Jack 30 and connector assemblies 34 and 36 can be of any suitable form known in the art for these purposes and both data and power may utilize a single coupling means. It will be noted that the assemblies 34 and 36 are selected and arranged to mate with the corresponding assemblies in the stacked sections 12 or 14 so as to effectively transfer data and power between the sections. Assemblies 34 and 36 can be supported against the inside surface of the back wall of section 10, so as to fit into suitable cut-out in the overhanging edge of the frame of section 10, and connector jacks 16 can be supported within cut-outs through the back wall of the section 10 frame as shown. As shown, section 10 also includes thermostat means, shown as a thermostat 22 mounted on the side wall, for controlling thermoelectric cooling means in section 12 based on air temperature within the enclosure. In addition, as illustrated, section 10 may include insulation material 38 covering main interior surfaces of the walls and bottom of the section and may further include alignment means shown as pins 58A which engage corresponding indentations 58B in the lower surface of stacked section 12 or 14, and support feet 40 of rubber or other suitable material on the bottom surface of section 10. The basic structural frame of section 10 may be steel or other suitable material such as plastic, with internal insulation layer 38 as described. In describing sections 12 and 14 it will be assumed that construction details and materials correspond to those described for section 10, unless otherwise noted.

FIGS. 4A and 4B show an expansion section 14 suitable for enclosing one or more circuit boards and including top and bottom openings 42 and 44. Section 14 is shown as incorporating structural members 46 useful for providing support for circuit boards which may be inserted into data ports, shown as board coupling jacks 30. Circuit boards may also be supported in mounting slots which can be provided on the sides of section 14. The Section 14 also includes data and power coupling means 34 and 36 associated with each of the openings 42 and 44, corresponding or mating elements being indicated by the same reference numeral. FIG. 4A shows connector assemblies 34 and 36 associated with the opening 42 and in the FIG. 4B sectional view the connector assembly 36A associated with opening 44 is visible. Thus, when section 14 is placed in a stacked relationship with other sections, data and power connectors 36 and 34 couple to cooperating connector assemblies in the upper contiguous section and connector 36A correspondingly couples to the lower contiguous section. Similarly, fasteners 24 at the upper and lower edges of the front and back faces of section 14 engage cooperating fasteners on the lower and upper edges of sections 12 and 10 respectively.

FIGS. 5A and 5B show a service section 12 suitable for enclosing power supply and cooling elements, and having a bottom opening 52. As shown in FIG. 5B, partition means, shown as partition 50 which separates the interior of section 12 into a first space adjoining opening 52 and a second space isolated from the opening 52 by the partition 50, bears insulating layer 38. Service section 12 includes thermoelectric cooling means, shown as an available type of thermoelectric unit 54 mounted through an opening in partition 50, a power supply 56, two fan units 60 and 62 and, as previously described, a line power input port 18, coupling means 34 and 36, and fasteners 24.

As illustrated, cooling unit 54 is mounted through partition 50 so that in operation its "cool" side is within, or accessible to, the sealed circuit board enclosure formed by the sections 10, 12 and 14 fastened together, and its "hot" side faces into the space above the partition 50. That space above the partition 50 is vented to permit fan 60 to circulate external air through the vents 20 in the ends of section 12 (see FIGS. 1 and 2) to cool the hot side of unit 54. Operation of thermoelectric cooling units is well known., whereby when electrically activated the unit is effective to transfer heat from one side of the unit to the other side and fans or other means may provide enhanced heat transfer from and to air adjacent to the cold and hot sides of the unit 54, respectively. Fan unit 60, shown mounted adjacent to one of the vents 20, is effective to provide a flow of air on the hot side of unit 54 to dissipate heat. Fan 60 is shown dotted in FIG. 5A because it is mounted above partition 50 (which is viewed from below in FIG. 5A). Fan 62, shown mounted below partition 50 adjacent the cool side of unit 54, may be included to increase air flow beyond normal convection currents resulting from heated air rising from the vicinity of circuit board components and cooled air falling from the vicinity of cooling unit 54. Thermostat 22, located in section 10 or alternatively in section 12, is effective to cause the thermoelectric unit 54 to be turned on and off to maintain air temperature inside the enclosure within a desired range. Section 12 is shown as also including a power supply 56, which is of a type appropriate for using line power input through port 18 to provide power at various voltages required for circuit board operation. Line power input at port 18 is also provided to cooling unit 54 and fans 60 and 62.

It will now be apparent that by providing the cooperating openings in sections 10, 12 and 14, cooling air can be circulated through the unit, via opening 52 in the bottom of section 12, to maintain temperatures inside the enclosure within acceptable operating ranges. Specifics of the design of suitable power supplies and cooling units, fans and associated vanes and ducts for control of forced or convective air flow, as well as interconnecting wiring (not shown) between the various units, connectors and jacks, can readily be determined by those skilled in the art. Thus, it may be desirable to provide a sealed enclosure utilizing a suitable thermoelectric cooling unit whose hot side heat exchanger is exposed on the top of section 12, in which case fan 60 might be omitted.

The enclosure assembly has been described in the context of a design in which a base section, for enclosing a main circuit board, is arranged so that a service section, for enclosing power and cooling elements, can be stacked on and mated to the base section. Similarly, one or more expansion sections can be added to the stack, with all of the sections mated and fastened together to provide a sealed, temperature controlled enclosure. It will be apparent, however, once the invention is understood, that in other applications it may be desirable to use the service section as the base section and no limitation as to the placement or the specific content of each section of an expandable enclosure in accordance with the invention, or the specific form or placement of a partition, is contemplated or intended.

While there have been described what are believed to be the preferred embodiments of the invention, those skilled in the art will recognize that other and further modifications may be made thereto without departing from the invention and it is intended to claim all such changes and modifications as fall within the true scope of the invention.

I claim:

1. An expandable refrigerated enclosure for electronic circuit boards, comprising:
   a first section suitable for enclosing an electronic circuit board and including data input and output means and an air-flow opening in a principal horizontal surface;
   a service section including an air-flow opening in a principal horizontal surface cooperating with said first section air-flow opening, partition means for containing a space within said service section adjoining said service section air-flow opening, and thermoelectric cooling means for transferring heat through a secured opening in said partition to provide cooled air in said space; and
   first and second data and power coupling means, respectively supported by said first section and said service section for releasably mating when said first section and service section air-flow openings are in cooperating alignment and for enabling releasable mating to data and power coupling means of an insertable expansion section which includes bottom and top air-flow openings adapted to cooperate with said air-flow openings of said first and service sections;
   whereby a two section enclosure is adapted for insertion of an expansion section having cooperating air-flow openings and data and power coupling means and cooled air is enabled to flow through said cooperating air-flow openings between said first and service sections to cool an internal space which is enclosed to inhibit entry of external air.

2. An expandable refrigerated enclosure as described in claim 1, additional comprising an expansion section inserted between said first and service sections and suitable for enclosing an additional electronic circuit board, said expansion section including:
   an enclosure section suitable for enclosing an electronic circuit board, and including top and bottom air-flow openings adapted to cooperate with said air-flow openings of base and service sections, to permit internal air flow while inhibiting entry of external air; and
   data and power coupling means, supported by said enclosure section, and adapted to cooperate with similar means supported by other sections of said expandable enclosure.

3. An expandable refrigerated enclosure as described in claim 1, additionally comprising a plurality of expansion sections stacked on top of each other and inserted between said first and service sections, each such expansion section being suitable for enclosing an additional electronic circuit board, each said expansion section including:
   an enclosure section suitable for enclosing an electronic circuit board, and including top and bottom air-flow openings adapted to cooperate with said air-flow openings of base and service sections, to permit internal air flow while inhibiting entry of external air; and
   data and power coupling means, supported by said enclosure section, and adapted to cooperate with similar means supported by other sections of said expandable enclosure.

4. An expandable refrigerated enclosure as described in claim 1, wherein said partition internally separates said service section into a first space adjoining said service section air-flow opening and a second space isolated from said opening, said thermoelectric cooling means is mounted through a secured opening in said partition so as to transfer heat from said first space to said second space, and said enclosure additionally comprises fan means and vent means in said second space for jointly venting hot air from said second space, and thermostat means, mounted in said first section, for controlling said thermoelectric cooling means based on air temperature within the enclosure.

5. An expandable refrigerated enclosure for electronic circuit boards, comprising:
   a base section suitable for enclosing an electronic circuit board and including a top air-flow opening;
   a service section suitable for enclosing a power supply and including a bottom air-flow opening adapted to cooperate with said base section top air-flow opening, partition means for containing a space within said service section adjoining said service section air-flow opening, and thermoelectric cooling means for transferring heat through a secured opening in said partition to provide cooled air in said space; and
   first and second data and power coupling means respectively supported by said base section and service section, for releasably mating when said base section and service section air-flow openings are in cooperating alignment and for enabling releasable mating to data and power coupling means of an insertable expansion section which includes bottom and top air-flow openings adapted to cooperate with said air-flow openings of said base and service sections;
   whereby a two section enclosure is adapted for insertion of an expansion section between said base and service sections and cooled air is enabled to flow through said cooperating air-flow openings between said base and service sections to cool an internal space which is enclosed to inhibit entry of external air.

6. An expandable refrigerated enclosure as described in claim 5, wherein said partition internally separates said service section into a first space adjoining said service section air-flow opening and a second space isolated from said opening, said thermoelectric cooling means is mounted through a secured opening in said partition so as to transfer heat from said first space to said second space, and said enclosure additionally comprises fan means and vent means in said second space for jointly venting hot air from said second space, and thermostat means, mounted in said base section, for controlling said thermoelectric cooling means based on air temperature within the enclosure.

7. An expandable refrigerated enclosure as described in claim 5, additionally comprising one or more expansion sections inserted between said base and service stations and suitable for enclosing an additional electronic circuit board, each said expansion section including:
- an enclosure section suitable for enclosing an electronic circuit board, and including top and bottom air-flow openings adapted to cooperate with said air-flow openings of base and service sections, to permit internal air flow while inhibiting entry of external air; and
- data and power coupling means, supported by said enclosure section, and adapted to cooperate with similar means supported by other sections of said expandable enclosure.

8. An expandable refrigerated enclosure as described in claim 7, wherein said partition internally separates said service section into a first space adjoining said service section air-flow opening and a second space isolated from said opening, said thermoelectric cooling means is mounted through a secured opening in said partition so as to transfer heat from said first space to said second space, and said enclosure additionally comprises fan means and vent means in said second space for jointly venting hot air from said second space, and thermostat means, mounted in said base section, for controlling said thermoelectric cooling means based on air temperature within the enclosure.

9. An expandable enclosure as described in claim 5, additionally comprising insulation material adjacent to the walls of said base and service sections and arranged so that the adjacent interior spaces of said sections form a cooled insulated enclosure for circuit boards which is sealed to prevent entry of outside air.

10. An expandable enclosure as described in claim 7, additionally comprising alignment means on the cooperating surfaces of said base, service and expansion sections for aligning said sections and fastening means for releasably coupling said base, service and expansion sections together.

11. An expandable enclosure for electronic circuit boards, comprising:
- a base section suitable for enclosing a main electronic circuit board and including a data input and output port, a top air-flow opening and data and power coupling means adapted to cooperate with other enclosure sections;
- an expansion section suitable for enclosing an electronic circuit board and including top and bottom air-flow openings and data and power coupling means adapted to cooperate with other enclosure sections;
- a service section suitable for enclosing power supply and thermoelectric cooling elements and including a bottom air-flow opening and data and power coupling means adapted to cooperate with other enclosure sections; and
- fastening means adjacent said openings for releasably coupling said base, expansion and service sections together.

12. An expandable enclosure as described in claim 11, additionally comprising insulation material adjacent to the walls of said sections and arranged so that the adjacent interior spaces of said sections form a cooled insulated enclosure for circuit boards which is sealed to prevent entry of outside air and said thermoelectric cooling element extends through a secured opening in a surface of said sealed enclosure to permit heat transfer while inhibiting entry of external air.

* * * * *